(12) United States Patent
Rundle et al.

(10) Patent No.: US 9,378,433 B2
(45) Date of Patent: Jun. 28, 2016

(54) METHOD AND SYSTEM FOR ADDRESS RESULT ARBITRATION

(71) Applicants: Alfred T. Rundle, Endwell, NY (US); Lennart A. Saaf, Endicott, NY (US)

(72) Inventors: Alfred T. Rundle, Endwell, NY (US); Lennart A. Saaf, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 26 days.

(21) Appl. No.: 14/624,059

(22) Filed: Feb. 17, 2015

(65) Prior Publication Data

US 2015/0161479 A1    Jun. 11, 2015

Related U.S. Application Data

(63) Continuation of application No. 11/438,720, filed on May 22, 2006, now abandoned, which is a continuation of application No. 10/144,021, filed on May 13, 2002, now Pat. No. 7,095,875.

(60) Provisional application No. 60/290,892, filed on May 15, 2001.

(51) Int. Cl.
| | |
|---|---|
| G06K 9/62 | (2006.01) |
| G06K 9/72 | (2006.01) |
| B07C 7/00 | (2006.01) |
| G06K 9/32 | (2006.01) |
| G06N 5/02 | (2006.01) |

(52) U.S. Cl.
CPC .............. *G06K 9/6227* (2013.01); *B07C 7/005* (2013.01); *G06K 9/325* (2013.01); *G06K 9/6263* (2013.01); *G06K 9/726* (2013.01); *G06N 5/027* (2013.01); *G06K 2209/01* (2013.01); *Y10S 209/90* (2013.01)

(58) Field of Classification Search
CPC . G06K 9/00469; G06K 9/6267; G06K 9/626; G06K 9/6262; G06K 9/6263; Y10S 209/90
See application file for complete search history.

(56) References Cited

U.S. PATENT DOCUMENTS

| | | | | |
|---|---|---|---|---|
| 5,226,174 A | * | 7/1993 | Yagasaki et al. | 395/800 |
| 5,966,464 A | * | 10/1999 | Kojima | 382/228 |
| 5,970,171 A | * | 10/1999 | Baraghimian et al. | 382/187 |
| 7,095,875 B2 | * | 8/2006 | Rundle et al. | 382/101 |

* cited by examiner

*Primary Examiner* — Andrew W Johns
(74) *Attorney, Agent, or Firm* — Burns & Levinson LLP; Orlando Lopez

(57) ABSTRACT

A method to arbitrate between results obtained from observationally data derived by several procedures. Each procedure is given a ranking according to the confidence on the procedure. The results and characteristics derived from the results are used in a plurality of rules, where the rules are used to arbitrate between the results.

18 Claims, 4 Drawing Sheets

METHOD AND SYSTEM FOR ADDRESS RESULT ARBITRATION

CROSS REFERENCE TO RELATED APPLICATIONS

This application is a continuation of co-pending U.S. patent application Ser. No. 11/438,720, entitled RULE-BASED ARBITRATION OF MULTIPLE OPTICAL CHARACTER RECOGNITION RESULTS FOR ZIP CODE RECOGNITION, filed on May 22, 2006, which is a continuation of U.S. patent application Ser. No. 10/144,021, entitled METHOD AND SYSTEM FOR ADDRESS RESULT ARBITRATION, filed on May 13, 2002, which claims priority to and benefit of U.S. Provisional Application No. 60/290,892, filed on May 15, 2001, all of which are hereby incorporated by reference herein in their entirety and for all purposes.

BACKGROUND OF THE INVENTION

This invention relates generally to the arbitration between results obtained by more than one method for matching observationally derived data to data from a number of databases, and, more particularly to arbitrating or deciding between address recognition methods for automatically recognizing addresses on items in an automated delivery system.

Due to the ever increasing volume of postal items and packages being delivered, postal services and delivery services are increasingly relying on optical character recognition to recognize the addresses of the items to be delivered. As address recognition performance levels improve, it becomes increasingly difficult to make significant advances in performance with a single address recognition system. Consequently, two or more independent address recognition systems are applied and a method is required to arbitrate competing results from these systems to select on a case by case basis the result most likely to be accurate.

Present methods and systems for arbitrating competing results from two or more independent address recognition systems utilize a small subset of result characteristics. Present methods and systems use the level of "trust" associated with the address recognition engine that produced the result as the primary arbitration factor. In addition present methods and systems also use a coarse indication of an alphanumerical "postal code" (for example, ZIP Code in the U.S. Postal Service) matching against a limited set of results when from one or two other systems.

A method and system for arbitrating competing results from address recognition systems that are extendable to an arbitrary number of address recognition systems and which utilize a number of the characteristics of the results from the address recognition systems are needed.

SUMMARY OF THE INVENTION

A method and system to arbitrate between results obtained from observationally derived data by several procedures, where the results are items characteristic of the observationally derived data are disclosed. In the method, each procedure is given a ranking according to the confidence on the procedure. The results and characteristics derived from the results are used in a plurality of rules, where the rules are used to arbitrate between the results. The method generically comprises the steps of:

(a) classifying each result according to a level of accuracy at which it matches a datum from one of several databases, (b) comparing each result corresponding to one observationally derived datum to results for that observationally derived datum obtained from other procedures, (c) obtaining at least one indicator for each result, that indicator indicating a degree of success of the comparison of results, (d) selecting a group of the rules according to an algorithm, where the rules utilize as inputs the results and characteristics derived from the results, the characteristics including the at least one indicator and the results of the comparative step, (e) applying the selected rules according to the algorithm, (f) obtaining, from applying the selected rules, arbitrated results.

The method can also include, but is not limited to, the steps of: comparing the results to a number of known incorrect results, and, discarding any of the results that matches any one of said known incorrect results, in which case, only the non-discarded results are arbitrated.

In one embodiment, observationally derived data is data derived from mail pieces, such as addresses, and the result is an alphanumerical code, such as a ZIP Code in the U.S. Postal Service. However, the invention need not be limited to delivery systems for addressed pieces and could be applied to any system where arbitration of results between several procedures is required.

For a better understanding of the present invention, together with other and further objects thereof, reference is made to the accompanying drawings and detailed description and its scope will be pointed out in the appended claims.

DETAILED DESCRIPTION

A method to arbitrate between results obtained from observationally derived data by several procedures, where the results are items characteristic of the observationally derived data is disclosed. An example of procedures that generate results from observationally derived data are address recognition systems utilizing optical character recognition recognizing the addresses of the items to be delivered in a postal system or a delivery system. The method of this invention is extendable to an arbitrary number of procedures and utilizes a number of the characteristics of the results from the procedures.

Figure 1:
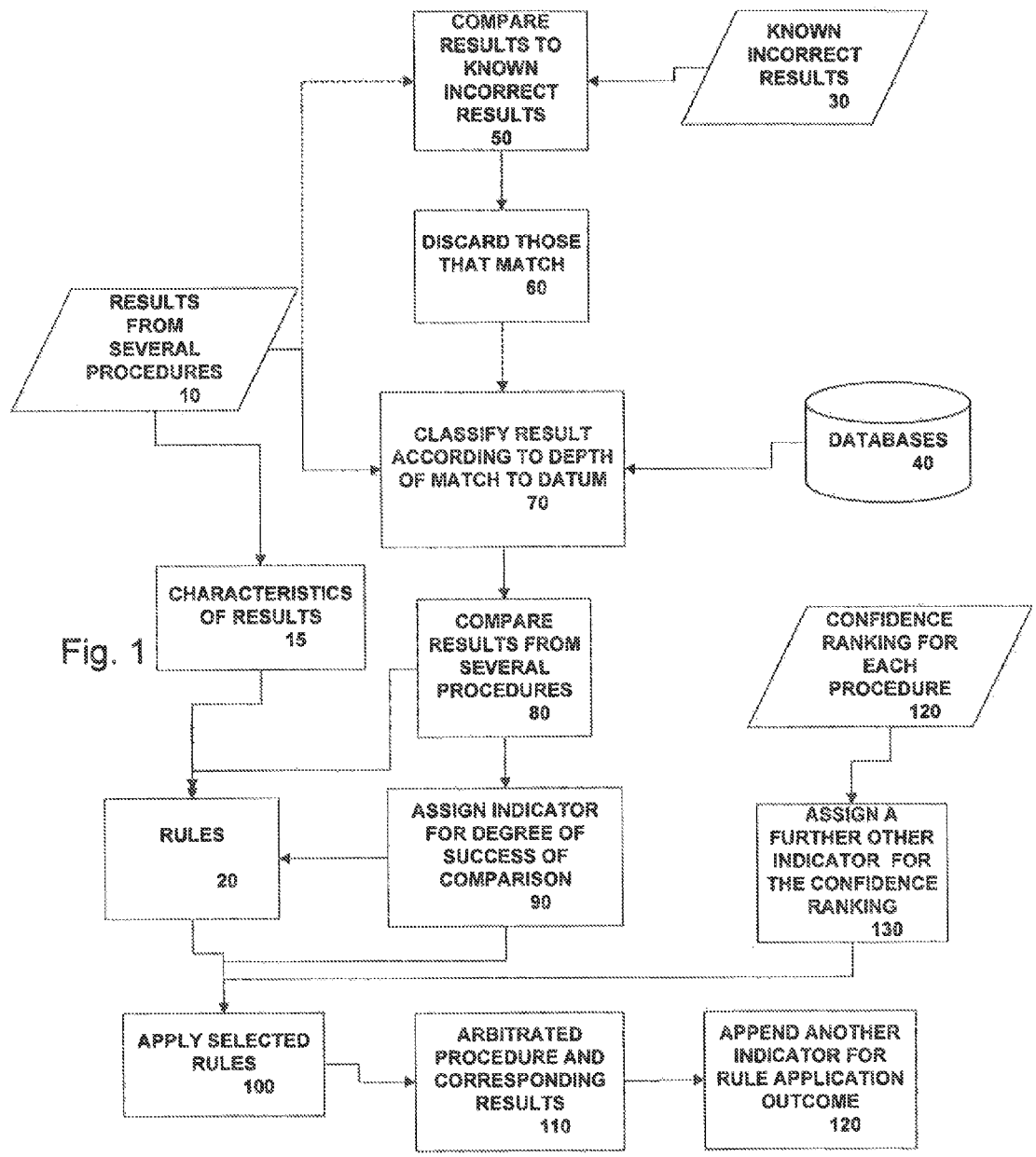
FIG. 1 is a flowchart of an embodiment of the method of this invention.

A flowchart of an embodiment of the method of this invention is shown in FIG. 1. Results from several procedures 10 are compared to data from one of several databases 40 and classified according to a level of accuracy at which it matches a datum from one of the several databases 40 (step 70, FIG. 1).

The method can include a pre-processing series of steps in which the results 10 are compared to known incorrect results 30 (steps 50 and 60, FIG. 1). Some of procedures can generate known incorrect results as part of the normal course of operation of the procedure. For example, a procedure can have access to several databases of a different precision. Results from such a procedure that are inconsistent when compared to data bases of a different precision are considered incorrect results. In the first of the pre-processing steps, the results 10 are compared to known incorrect results 30 (step 50, FIG. 1). Any of the results 10 that matches one of the known incorrect results 30 is discarded (step 60, FIG. 1). The non discarded results are then compared to data from one of several databases 40 and classified according to a level of accuracy at which it matches a datum from one of the several databases 40 (step 70, FIG. 1).

Each result 10 corresponding to one observationally derived datum is compared to results 10 for the same observationally derived datum obtained from other ones of the procedures (step 80, FIG. 1). At least one indicator, indicating a degree of success of the comparison of results for each result corresponding to the same observationally derived datum, is assigned to each result 10 (step 90, FIG. 1).

Each procedure has a given ranking 120 according to the confidence on that procedure. An indicator of the ranking of confidence of the procedure that produced the result (hereafter called a confidence value) is assigned to each result (step 130, FIG. 1).

A data structure (not shown) can be constructed including the results, an identifier for each of the procedures that produced the results, the ranking according to confidence for each of the procedures, the confidence value for each result, and, at least one indicator for each result indicating the degree of success of the comparison of results for each result.

A set of rules 20, aimed at hierarchically obtaining a maximum number of successful results, is utilized in the arbitration process. The rules codify known practices and desired procedures for obtaining successful results or eliminating unsuccessful results. The rules utilize as inputs the results 10 and characteristics derived from the results, the characteristics including the at least one indicator and the results of the comparison of results (performed in step 80, FIG. 1). The results 10 (not including the discarded ones if pre-processing was performed), the at least one indicator, indicating the degree of success of the comparison of results for each result, the confidence value for each result 10 and selected ones of the rules 20 are inputs to an algorithm applying the selected rules to arbitrate between results corresponding to the same observationally derived datum but obtained by different procedures (step 100, FIG. 1). The outcome is the determination, from the arbitration, of a procedure, from which results most likely to be accurate are obtained (step 110, FIG. 1). Another indicator indicative of the outcome of applying the selected rules is appended to each result (step 120, FIG. 1). An embodiment of the method as applied to arbitrating competing results from two or more independent address recognition systems used in postal systems or package delivery systems is described below.

Arbitration of Results of Address Recognition Systems

Figure 2:
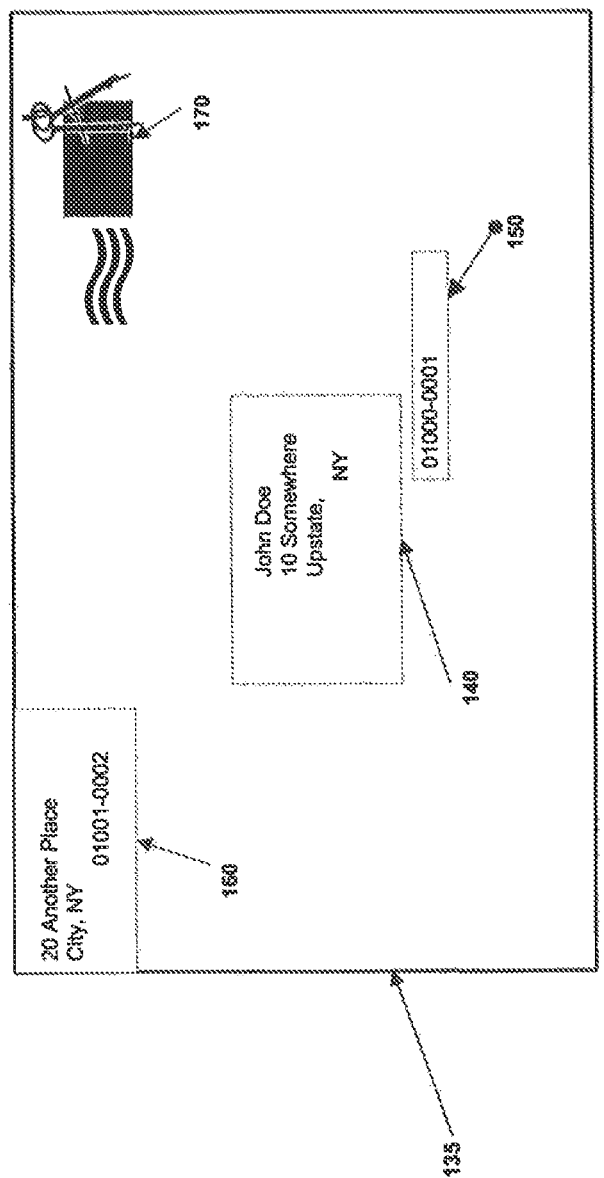
FIG. 2 is a graphical representation of an envelope as input to an address recognition system.

When two or more independent address recognition systems utilizing optical character recognition are used in postal services or package delivery services, the result used for arbitration is an alphanumerical code characterizing each address. (In the U.S. Postal Service, the alphanumerical code is a ZIP Code, a five, nine or eleven digit code, the first five of which are most commonly used.) In such systems, an addressed piece, such as envelope 135 shown in FIG. 2, is scanned by scanning means and the scanned output is provided as input to the address recognition systems utilizing optical character recognition. The optical character recognition (OCR) modules provide data on the delivery address 140, the alphanumerical code 150 (herein after referred to as the ZIP Code) and the return address 160 as well as other possible items on the addressed piece 135, such as a bar code (not shown).

Figure 3:
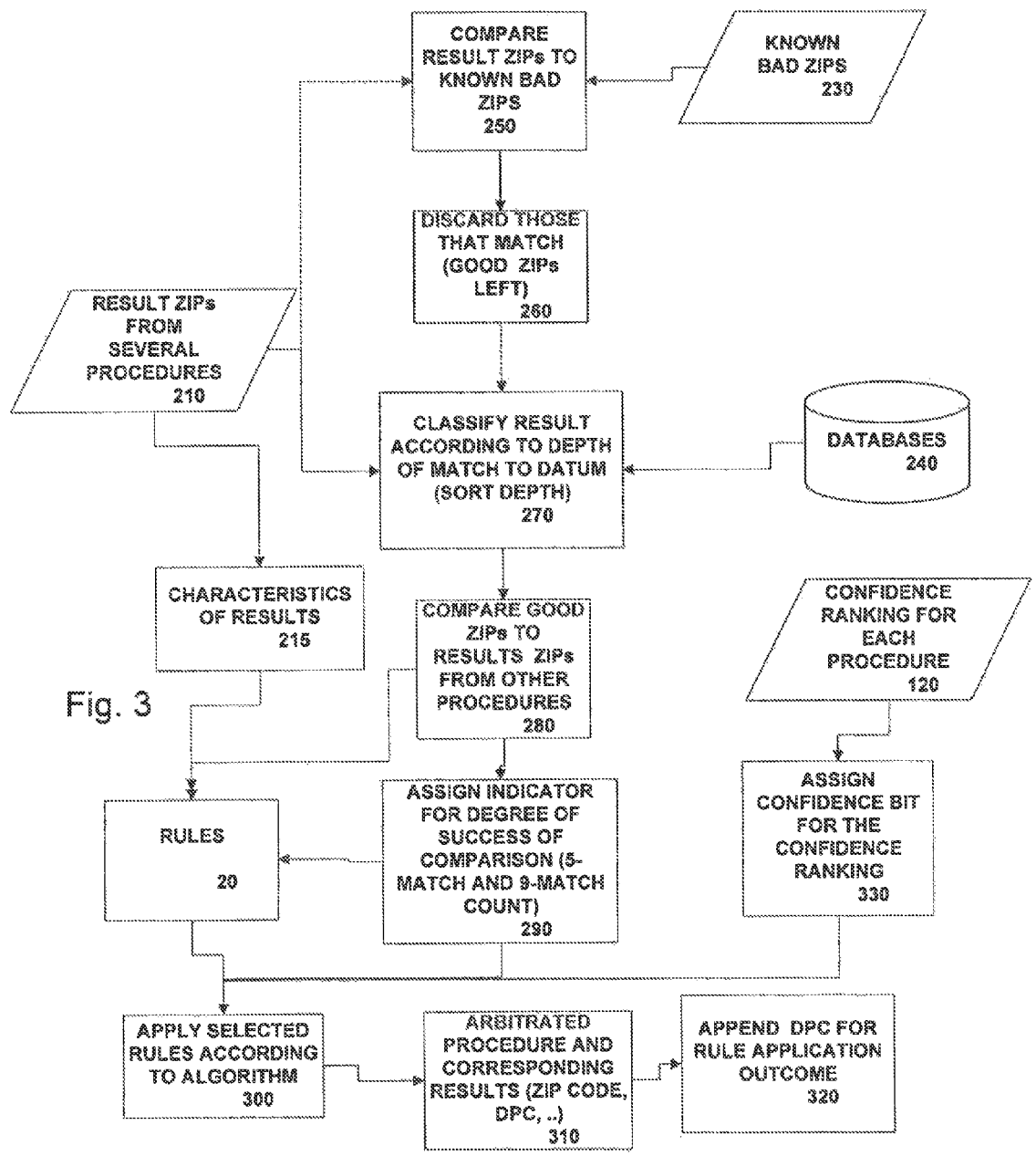
FIG. 3 is a flowchart of an embodiment of the method of this invention applied to arbitration of results of address recognition.
Figure 4:
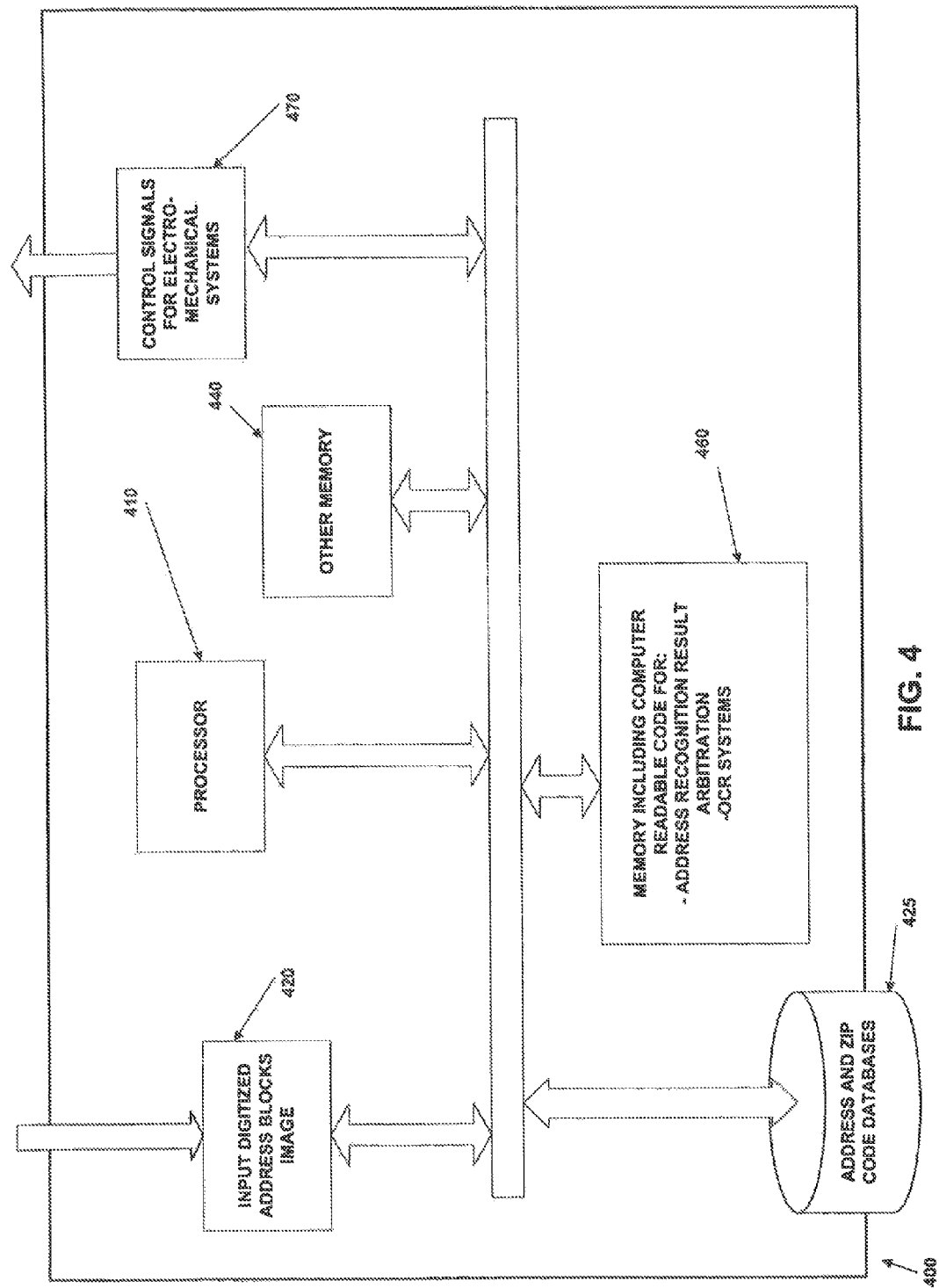
FIG. 4 is a block diagram of an embodiment of a system of this invention used for arbitration of results of address recognition.

A flowchart of an embodiment of the method of this invention applied to arbitration of results of address recognition systems is shown in FIG. 3. Result ZIPs from several procedures 210 are compared to data from one of several databases 240 and classified according to a level of accuracy at which it matches a datum from one of the several databases 40 (step 270, FIG. 3). Step 270 is hereinafter referred to as classifying as to sort depth.

The method can include a pre-processing series of steps in which the result ZIPs 210 are compared to known. "Bad ZIPs" 230 (steps 250 and 260, FIG. 3). Some address recognition systems are able to assert as part of their input to the arbitration process "bad" ZIP Codes developed internally as a possible delivery address, but rejected for specific attributes that indicate an error situation. For example, an address recognition system may have access to multiple address databases 240 of different precision. One address database (low precision) might represent a range between starting and ending address numbers on a street where a second database (high precision) lists the addresses only for existing dwellings on the street. An address recognition system with access to both databases can provide as input to the arbitration process ZIPS which are "bad" in the sense that they are inconsistent with the high precision database, but are likely outcomes from engines that have access only to a low precision database. In the first of the pre-processing steps, the results 10 are compared to known incorrect results 30 (step 50, FIG. 1). Any of the result ZIPs 210 that matches one of the known "Bad" ZIPs 230 is discarded (step 260, FIG. 3). The non discarded ZIPs are then compared to data from one of several databases 240 and classified according to "sort depth" (step 270, FIG. 3).

Each result ZIP 210 corresponding to one observationally derived datum is compared to results 210 for the same observationally derived datum obtained from other ones of the procedures (step 280, FIG. 3). The arbitration method considers the quantity and extent of matches and mismatches between ZIP results from different address recognition procedures (also referred to as systems). For USA ZIP Codes, a distinction is made in the arbitration process between mismatches in four sub-fields of the ZIP Code: —High order 3 digits (which identify a large region, sometimes incorporating multiple cities or towns)—High order 5 digits (typically unique within a single city) High order 9 digits (typically unique to a carrier route)—11 digits (identifying a specific delivery point). As an example of arbitration process sensitivity to the extent of mismatch, the process considers mismatches in the high order 3 digits as a possible indication that one of the engines has asserted a return address result instead of the intended delivery address. At least one indicator, indicating a degree of success of the comparison of results for each result corresponding to the same observationally derived datum, is assigned to each result ZIP 210 (step 290, FIG. 3).

Implementations of such indicators are a 9-Match Count and a 5-Match Count defined below. The 9-Match Count is obtained by comparing 9 digits of each Result ZIP 210 to result ZIPs 210 from other processes, including ZIPS of lower or finest depth. The 9-Match is incremented for each match against a ZIP created by a different database matching technique (hereinafter referred to as a DLU). Each different DLU is counted only once. The 5-Match Count is defined by comparing 5 digits of each Result ZIP 210 to Result ZIPs 210 from other processes. Increment the 5-Match for each match against a ZIP created by a different Address Block Location (ABL) algorithm.

Each procedure has a given ranking 120 according to the confidence on that procedure. An indicator of the ranking of confidence of the procedure that produced the result (hereafter called a confidence value) is assigned to each result ZIP (step 330, FIG. 3).

A data structure can be constructed including the result ZIPS 210, an identifier for each of the procedures that produced the results, the ranking 120 according to confidence for each of the procedures, the 5-Match Count, the 9-Match Count, and the sort depth. An implementation of the data structure is shown in Table 1 below.

TABLE 1

Result structure

| Result ZIP | Finalized ZIP | Source | Class | Subclass | DLU type | ABL type | Sort Depth (Finest, and enumerated types) | 5- Match Count | 9- Match Count |
|---|---|---|---|---|---|---|---|---|---|
| | | DS | 0 | 0 | RCR | RCR | | | |
| | | Char_M | 0 | 1 | RCR | MLOCR | | | |
| | | Char_C | 0 | 2 | RCR | RCP | | | |
| | | B Gray | 0 | 3 | B | B | | | |
| | | CSAR | 1 | 0 | USPS or B | RCP or MLOCR | | | |
| | | D | 2 | 0 | B | MLOCR | | | |
| | | M | 2 | 1 | USPS | MLOCR | | | |
| | | C | 2 | 2 | USPS | RCP | | | |

The Class and Subclass items in the Result structure of Table 1 are indicators of the quality or precision of the results expected (or confidence for each of the procedures). Class 0 indicates the highest precision or highest confidence results; Class 2 indicates a lower precision or lower confidence result. That is, the lower the class number the higher the accuracy (confidence) of the result. Subclasses serve to provide a finer ranking of results according to precision (confidence). Subclass 0 indicates the highest precision (confidence) among the subclasses; Subclass 2 indicates a lower precision (confidence) result among the subclasses. Thus, class 0 and subclass 0 would produce the ranking of highest confidence. Class 2, subclass 2 indicates a lower precision (confidence) result (the lowest shown in Table 1). The indicator of the ranking of confidence of the procedure that produced the result, the confidence value, can be obtained from the class, subclass values.

A set of rules 20, aimed at hierarchically obtaining a maximum number of successful results, is utilized in the arbitration process. The rules codify known practices and desired procedures for obtaining successful results or eliminating unsuccessful results. The result ZIPs 210 (not including the discarded ones if pre-processing was performed), the at least one indicator, indicating the degree of success of the comparison of results for each result, the confidence value for each result 310 and selected ones of the rules 20 are inputs to an algorithm applying the selected rules to arbitrate between results corresponding to the same observationally derived datum but obtained by different procedures (step 300, FIG. 3). The outcome is the determination, from the arbitration, of a procedure, from which results most likely to be accurate are obtained (step 310, FIG. 3). A second indicator, a Delivery Print Code (DPC), indicative of the outcome of applying the selected rules is appended to each result (step 320, FIG. 3). As an outcome of applying the selected rules, a ZIP Code is selected corresponding to the result selected from arbitration among procedures. This ZIP Code provides a major datum for address recognition.

One embodiment of the rules is given below.

Return-to-Sender/Forwarding Detection:

1) System Reject if return-to-sender/forwarding case has been found from any source.

This is an implementation of a rule that comprises detecting specific information in observationally derived data. Other implementations include detection by one or more address recognition systems that the mail piece falls into a specific class such as Business Reply.

The "System Reject" outcome indicates that there is a very high likelihood that a ZIP result asserted by any of the procedures is very likely incorrect. For example, if one of the procedures detected with certainty that the mail piece has been marked as "Return to Sender", it would be unadvisable to accept ZIP results from the other procedures. If those other procedures are unaware of the "Return to Sender" indication, the destination address could be erroneously asserted (rather than, correctly, the return address) as a ZIP to be arbitrated. Once asserted, the "System Reject" outcome is retained as a piece of data in the electronic record that is associated with the mail piece, throughout the remaining automated mail processing steps.

Some address assignment systems have an on-line (real-time) phase and an off-line phase. Address resolution for the on-line phase must typically occur within seconds, while minutes or hours are allocated for off-line processing. Longer-running algorithms may be applied during the off-line phase to resolve difficult cases. The arbitration process for on-line processing will assert a "System Reject" outcome to prevent an erroneous result from occurring during off-line processing. The "System Reject" status can result in the mail piece receiving special handling (human intervention) during the off-line phase.

Mismatch in the First Three Digits of a ZIP (Known as SCF) Cases:

2) System Reject if there is an SCF mismatch among the combined set of finalized Class 0 and Class 1 ZIPs.

3) System Reject if there is an SCF mismatch among the combined set of finalized and partial Class 0 and Class 1 ZIPs.

4) System Reject if there is an SCF mismatch among the combined set of finalized Class 0, Class 1, and Class 2 ZIPs.

5) System Reject if there is an SCF mismatch among the combined set of finalized and partial Class 0, Class 1, and Class 2 ZIPs.

Conflicting Foreign:

6) Reject if there is a zone mismatch (assignments to different countries) among the combined set of finalized foreign Class 0, Class 1, and Class 2 ZIPs.

The above five rules (2 through 6) are implementations of rules that detect a lack of congruency of a group of digits in each one of said alphanumerical codes obtained from specific observationally derived data by several systems.

Supported Finest Depth ZIPs:

7) Select as arbitrated result the highest ranked (by Class, Subclass) Finest Depth ZIP with a 9-Match >0.

The above is an implementation of a rule that comprises ignoring, when more than one result is obtained corresponding to one observationally derived datum by several procedures, the results corresponding to that one observationally derived datum and obtained from the procedures having a lower confidence ranking.

8) Select as arbitrated result the highest ranked (by Class, Subclass) Finest Depth ZIP (RCR). This is a variation of rule 7.

5-Digit Match Among Finalized Results:

9) If there is no 5-digit mismatch among finalized results from Class 0, Class 1, and Class 2:

Order the ZIPs within the combined set of Class 0 and Class 1 by sort depth, then 9-Match, then Class. Select as arbitrated result the highest ranked finalized result.

10) If there is no 5-digit mismatch among finalized results from Class 0, Class 1, and Class 2:

Order the ZIPs within Class 0 by sort depth, then 9-Match, then Subclass. Select as arbitrated result the highest ranked finalized result.

11) If there is no 5-digit mismatch among finalized results from Class 0, Class 1, and Class 2:

Order the ZIPs within the combined set of Class 0 and Class 1 by 9-Match, then Class, then sort depth. Select as arbitrated result the highest ranked finalized result.

The above three rules are implementations of rules that comprise detecting congruency of a group of digits in each one of the alphanumerical codes obtained from specific observationally derived data by several procedures.

12) If there is no 5-digit mismatch among finalized results from Class 0, Class 1, and Class 2:

Order the ZIPs within Class 0 (and any from Classes 1 and 2 that are inherently finest depth) by sort depth, then 9-Match, then Subclass. Select as arbitrated result the highest ranked finalized result. This is a variation of rule 9.

5-digit mismatch among finalized results:

13) if there is a 5-digit mismatch among finalized results from Class 0, Class 1, and Class 2:

Order the ZIPs within the combined set of Class 0 and Class 1 by sort depth, then 5-match, then 9-Match, then Class. Select as arbitrated result the highest ranked finalized result.

14) If there is a 5-digit mismatch among finalized results from Class 0, Class 1, and Class 2:

Order the ZIPs within the combined set of Class 0 and Class 1 by 5-Match, then 9-match, then Class, then sort depth. Select as arbitrated result the highest ranked finalized result.

15) If there is a 5-digit mismatch among finalized results from Class 0, Class 1, and Class 2:

Order the ZIPs within the combined set of Class 0 and Class 1 by 5-match, then 9-Match, then Class, then sort depth. Select as arbitrated result the highest ranked finalized result with a 9-Match greater than zero. Otherwise reject.

16) If there is a 5-digit mismatch among finalized results from Class 0, Class 1, and Class 2:

Order the ZIPs within Class 0 by 9-Match, then 5-match, then Subclass, then sort depth. Select as arbitrated result the highest ranked finalized result with a 9-Match greater than zero. Otherwise reject.

17) If there is a 5-digit mismatch among finalized results from Class 0, Class 1, and Class 2:

Order the ZIPs within. Class 0 (and any from Classes 1 and 2 that are inherently finest depth) by 9-Match, then 5-match, then Subclass, then sort depth. Select as arbitrated result the highest ranked finalized result with a 9-Match greater than zero. Otherwise reject. This is a variation of rule 14.

The above five rules are also implementations of rules that comprise detecting congruency of a group of digits in each one of the alphanumerical codes obtained from specific observationally derived data by several procedures.

By the definition of the 9 Match Count and the 5 Match Count, the rules that utilize those Counts are implementations of rules that comprise utilizing knowledge of details of each of the procedures to determine a confidence level to each comparison of each result corresponding to one observationally derived datum to another result for the one observationally derived datum obtained from another one of the procedures.

No Finalized Results from RCR:

18) Select Current System Arbitrated Result (after Bad ZIP filtering) as arbitrated result, if there are no Class 0 finalized ZIPs.

19) Select Current System Arbitrated Result as arbitrated result, if its a non-finalized 5 digit ZIP (partial result) and there are no Class 0 finalized ZIPS. Otherwise reject.

20) Select Current System Arbitrated Result as arbitrated result, if its a non-finalized 5 digit ZIP (partial result) and there are no Class 0 finalized ZIPS. This is a variation of rule 16.

ID Tag:

21) If there are no five-digit finalizations among the Class 0 results, and if the ID-tag time stamp is more than 76 hours older than a control time stamp, then reject.

The above rule is an implementations of a rule that comprises a relationship between a time period, that time period comprising the difference between when a mail piece was sent and when the observationally derived data was obtained, and a probability of inaccuracy of the results obtained from the observationally derived data corresponding to that mail piece.

Selected ones of the above rules are applied together according to a decision algorithm in order arbitrate between the results of several independent address recognition systems applied to the same data. The implementations given below operate on an ordered sequence of selected ones of the above rules.

Algorithm A1
Rule Sequence: 1, 21, 18, 7, 3, 6, 9, 13
Comments:
  Picks finest depth result, despite conflicts at 5-digit level.
Algorithm A2
Rule Sequence: 1, 21, 18, 7, 3, 6, 9, 13
Comments:
  Do not perform bad. ZIP filtering.
  Picks finest depth result, despite conflicts at 5-digit level.
Algorithm A3
Rule Sequence: 1, 21, 18, 7, 3, 6, 9, 13
Comments:
  Do not perform bad ZIP filtering,
  9-Match count is incremented only if the ZIPS match to 11 digits.
  Picks finest depth result, despite conflicts at 5-digit level.

Algorithm B1 (Nominal Error Rate)
Rule Sequence: 1, 21, 18, 7, 3, 6, 9, 14
Comments:
  Should perform closest to the competitive test arbitration; differences:
  SCF mismatch includes conflicts with character-based results
Algorithm B2 (Nominal Error Rate)
Rule Sequence: 1, 21, 18, 7, 3, 6, 9, 14
Comments:
  Do not perform bad ZIP filtering.
  Should perform closest to the competitive test arbitration; differences
  SCF mismatch includes conflicts with character-based results
Algorithm B3 (Nominal Error Rate)
Rule Sequence: 1, 21, 18, 7, 3, 6, 9, 14
Comments:
  Do not perform bad ZIP filtering.
  9-Match count is incremented only if the ZIPs match to 11 digits.
  Should perform closest to the competitive test arbitration; differences:
  SCF mismatch includes conflicts with character-based results
Algorithm B4 (Nominal Error Rate)
Rule Sequence: 1, 21, 18, 7, 3, 6, 9, 14
Comments:
  Do not perform bad ZIP filtering,
  9-Match count is incremented only if the ZIPs match to 11 digits and both the ABLs and DLUs are from different sources.
  Should perform closest to the competitive test arbitration; differences
  SCF mismatch includes conflicts with character-based results
Algorithm C1 (Lower SCF Error Rate)
Rule Sequence: 1, 21, 18, 3, 6, 7, 9, 14
Comments:
  Slightly lower SCF error rate due to applying SCF mismatch early in sequence, over-riding all assignments
Algorithm D1 (Even Lower SCF Error Rate)
Rule Sequence: 1, 21, 18, 5, 6, 7, 9, 14
Comments:
  Lower SCF error rate due to applying SCF mismatch against results from all individual engines (not just against arbitrated current system results)
Algorithm E1 (Lower Overall Error Rate)
Rule Sequence: 1, 21, 18, 5, 6, 7, 11, 15
Comments:
  Lower error rate due to conservative approach for 5-digit mismatch cases—only asserting an answer if different DLUs arrive at a matching 9/11 digit finalization.
Algorithm F1 (Very Low Overall Error Rate)
Rule Sequence: 1, 21, 19, 5, 6, 7, 10, 16
Algorithm F2 (Very Low Overall Error Rate)
Rule Sequence: 1, 21, 20, 5, 6, 7, 12, 17

The rules and algorithms given above are not an exhaustive list. Other rules and algorithms can be applied and other characteristics of the results can be utilized as further inputs to the rules. For example, counts for mismatches of varying significance (5 digit, 9 digit) between competing results could be utilized as inputs to the rules or the algorithms. Similarly, a second confidence value associated with each result, asserted by the procedure that produces the ZIP result, could also be used as input to the rules or the algorithms. The second confidence value would be asserted by the procedure based on information regarding the observationally derived data (perhaps based on knowing that OCR results themselves were poor for that mail piece image, or that words in the address are apparently misspelled). The second confidence value would provide another input that could be utilized by an algorithm to determine a procedure, from which results most likely to be accurate are obtained.

The above algorithms implement a sequential application of selected, ones of the above rules in order to codify known operational or observed performance. A known method for achieving the same is through the application of the techniques of artificial intelligence. The algorithms and rules are already in a form akin to an inference engine and can be cast into a rule based system for decisions or an "Expert System" (see, for example, P. Harmon, D. King, *Expert Systems—Artificial Intelligence in Business*, ISBN 0-471-80824-5, 1985). Following more recent trends in artificial intelligence, the algorithms can be cast in the form of a neural network (see, for example, S. K. Rogers, M. Kabrisky, An Introduction to Biological and Artificial Neural Networks for Pattern Recognition, ISBN 0-8194-0534-5, 1991) or a genetic algorithm (also known as an evolutionary algorithm). In either the neural network, or the genetic algorithm, the rules can be generated by the neural network or the genetic algorithm. It should be apparent that, as other methods are developed in artificial intelligence or machine aided cognition, the algorithms can also be cast in the form of those methods.

The above method for arbitration between results obtained by more than one method for matching observationally derived data to data from a number of databases can be Elements and components described herein may be further divided into additional components or joined together to form fewer components for performing the same functions.

Each computer program within the scope of the claims below may be implemented in any programming language, such as assembly language, machine language, a high-level procedural programming language, or an object-oriented programming language. The programming language may be a compiled or interpreted programming language.

Each computer program may be implemented in a computer program product tangibly embodied in a computer-readable storage device for execution by a computer processor. Method steps of the invention may be performed by a computer processor executing a program tangibly embodied on a computer-readable medium to perform functions of the invention by operating on input and generating output.

Common forms of computer-readable or usable media include, for example, a floppy disk, a flexible disk, hard disk, magnetic tape, or any other magnetic medium, a CDROM, any other optical medium, punched cards, paper tape, any other physical medium with patterns of holes, a RAM, a PROM, and EPROM, a FLASH-EPROM, any other memory chip or cartridge, a carrier wave, or any other medium from which a computer can read.

Although the invention has been described with respect to various embodiments, it should be realized this invention is also capable of a wide variety of further and other embodiments within the spirit and scope of the appended claims.

What is claimed is:

1. A computer implemented method to arbitrate between results to be arbitrated in order to effectuate a desired result, each of said results to be arbitrated obtained by one of a plurality of procedures from observationally derived data, said each of said results to be arbitrated being an alphanumerical code characterizing an address, each of said results to be arbitrated having a representative characteristic, said representative characteristic hereinafter referred to as a type, said method comprising:
   a. ranking, utilizing a processor and computer usable memory that causes the processor to perform the method, each of the procedures according to confidence on each of said procedures;
   b. classifying each of the results to be arbitrated, utilizing a processor and computer usable memory that causes the processor to perform the method, according to a level of accuracy at which each of said results to be arbitrated matches a datum from a database of a plurality of databases;
   c. comparing, utilizing a processor and computer usable memory that causes the processor to perform the method, each of the results to be arbitrated to each other;
   d. obtaining, utilizing a processor and computer usable memory that causes the processor to perform the method, at least one indicator for each result to be arbitrated, said at least one indicator indicating a degree of success of comparing each of the results to be arbitrated to each other;
   e. generating rules, utilizing a processor and computer usable memory that causes the processor to perform the method, said rules utilizing as inputs said results to be arbitrated and information derived from said results to be arbitrated;
   f. selecting at least one of said rules;
   g. applying, utilizing a processor and computer usable memory that causes the processor to perform the method, said at least one of said rules to the results to be arbitrated and to the at least one indicator for each result to be arbitrated, said at least one of said rules being applied according to an algorithm;
   h. selecting, utilizing a processor and computer usable memory that causes the processor to perform the method, from application of said at least one of said rules, said desired result, said desired result being one of the results to be arbitrated;
said results to be arbitrated being of a same type of result as other said results to be arbitrated.

2. The method of claim 1 further comprising:
appending another indicator to each result to be arbitrated, said another indicator indicating an outcome of applying said at least one rule.

3. The method of claim 1 further comprising:
creating a data structure, said data structure comprising:
said results to be arbitrated;
said desired result;
one further other indicator indicating said ranking according to confidence for each of said results to be arbitrated; and
said at least one indicator for each of the results.

4. The method of claim 1 further comprising:
assigning to each of said results to be arbitrated yet another indicator of said ranking according to confidence of the procedure that produced said result to be arbitrated.

5. The method of claim 1 wherein said algorithm is implemented using techniques of artificial intelligence; said techniques of artificial intelligence being at least one technique selected from an inference engine, a neural network and a genetic algorithm.

6. The method of claim 1 wherein the alphanumerical code is a ZIP code.

7. A computer program product comprising:
a computer usable memory having computer readable code embodied therein for arbitrating between results to be arbitrated in order to effectuate a desired result, each one of said results to be arbitrated obtained from observationally derived data by one procedure from a plurality of procedures, said each one of said results to be arbitrated being an alphanumerical code characterizing an address, each of said results to be arbitrated having a representative characteristic, said representative characteristic hereinafter referred to as a type, and each of said results to be arbitrated being of a same type of result as other said results to be arbitrated, said computer readable code causing a computer system to:
   a. rank each of the procedures according to confidence on each of said procedures;
   b. classify each of the results to be arbitrated according to a level of accuracy at which each of said results to be arbitrated matches a datum from a database of a plurality of databases;
   c. compare each of the results to be arbitrated to each other;
   d. obtain at least one indicator for each result to be arbitrated, said at least one indicator indicating a degree of success of comparing each of the results to be arbitrated to each other;
   e. generate rules, said rules utilizing as inputs said results to be arbitrated and information derived from said results to be arbitrated;
   f. select at least one of said rules;
   g. apply said at least one of said rules to the results to be arbitrated and to the at least one indicator for each result to be arbitrated, said at least one of said rules being applied according to an algorithm;
   h. select from application of said at least one of said rules, said desired result, said desired result being one of the results to be arbitrated;
said results to be arbitrated being of a same type of result.

8. The computer program product of claim 7 where the computer readable code further causes a computer system to:
append another indicator to each result to be arbitrated, said another indicator indicating an outcome of applying said at least one rule.

9. The computer program product of claim 8 where the computer readable code further causes a computer system to:
create a data structure, said data structure comprising:
said results to be arbitrated;
said desired result;
one other indicator indicating said ranking according to confidence for each of said results to be arbitrated; and
said at least one indicator for each result to be arbitrated.

10. The computer program product of claim 7 wherein said observationally derived data comprises data derived from addressed pieces.

11. The computer program product of claim 7 wherein said algorithm is implemented using techniques of artificial intelligence; said techniques of artificial intelligence being at least one technique selected from an inference engine, a neural network and a genetic algorithm.

12. The computer program product of claim 7 wherein the alphanumerical code is a ZIP code.

13. A system including arbitration between results to be arbitrated in order to effectuate a desired result, the system comprising:
at least one processor;
at least one computer readable memory having instructions embodied therein for arbitrating between results to be arbitrated in order to effectuate a desired result, each one of said results to be arbitrated obtained from observationally derived data by one procedure from a plurality of procedures, said each one of said results to be arbitrated being an alphanumerical code characterizing an address, each of said results to be arbitrated having a representative characteristic, said representative characteristic hereinafter referred to as a type, and each of said results to be arbitrated being of a same type of result as other said results to be arbitrated, said instructions causing said at least one processor to:

a. rank each of the procedures according to confidence on each of said procedures;
b. classify each of the results to be arbitrated according to a level of accuracy at which each of said results to be arbitrated matches a datum from a database of a plurality of databases;
c. compare each of the results to be arbitrated to each other;
d. obtain at least one indicator for each result to be arbitrated, said at least one indicator indicating a degree of success of comparing each of the results to be arbitrated to each other;
e. generate rules, said rules utilizing as inputs said results to be arbitrated and information derived from said results to be arbitrated;
f. select at least one of said rules;
g. apply said at least one of said rules to the results to be arbitrated and to the at least one indicator for each result to be arbitrated, said at least one of said rules being applied according to an algorithm;
h. select from application of said at least one of said rules, said desired result, said desired result being one of the results to be arbitrated;

said results to be arbitrated being of a same type of result.

14. The system of claim 13 wherein the instructions embodied in the at least one computer readable memory further cause said at least one processor to:

append another indicator to each result to be arbitrated, said another indicator indicating an outcome of applying said at least one rule.

15. The system of claim 13 wherein the instructions embodied in the at least one computer readable memory further cause said at least one processor to:

create a data structure, said data structure comprising:

said results to be arbitrated;

said desired result obtained by applying said selected at least one rule;

one other indicator indicating said ranking according to confidence for each of said results to be arbitrated; and said at least one indicator for each of the results to be arbitrated.

16. The system of claim 13 wherein said algorithm is implemented using techniques of artificial intelligence; said techniques of artificial intelligence being at least one technique selected from an inference engine, a neural network and a genetic algorithm.

17. The system of claim 13 wherein said observationally derived data comprises data derived from addressed pieces.

18. The system of claim 13 wherein the alphanumerical code is a ZIP code.

* * * * *